(12) United States Patent
Bhagavat et al.

(10) Patent No.: US 9,679,187 B2
(45) Date of Patent: Jun. 13, 2017

(54) FINGER BIOMETRIC SENSOR ASSEMBLY INCLUDING DIRECT BONDING INTERFACE AND RELATED METHODS

(71) Applicant: Apple Inc., Cupertino, CA (US)

(72) Inventors: Milind S. Bhagavat, Cupertino, CA (US); Patrick E. O'Brien, Cupertino, CA (US); Jun Zhai, Cupertino, CA (US); Dale R. Setlak, Cupertino, CA (US); David D. Coons, Cupertino, CA (US); Kwan-Yu Lai, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 225 days.

(21) Appl. No.: 14/741,831

(22) Filed: Jun. 17, 2015

(65) Prior Publication Data

US 2016/0371529 A1  Dec. 22, 2016

(51) Int. Cl.
*G06K 9/00* (2006.01)
(52) U.S. Cl.
CPC .............................. *G06K 9/00053* (2013.01)
(58) Field of Classification Search
CPC ............ G06K 9/00013; G06K 9/0002; G06K 9/00053; G06K 9/20; G06K 9/2009; G06K 9/209; H01L 23/291; H01L 23/298; H01L 23/562; H01L 27/14634; H01L 27/14678
See application file for complete search history.

(56) References Cited

U.S. PATENT DOCUMENTS

| | | | |
|---|---|---|---|
| 2009/0257626 A1* | 10/2009 | Sherlock et al. | 382/126 |
| 2011/0309482 A1* | 12/2011 | Salatino et al. | 257/659 |
| 2013/0259329 A1 | 10/2013 | Wickboldt et al. | G06K 9/00013 |
| 2015/0146944 A1* | 5/2015 | Pi et al. | G06K 9/00087 382/124 |
| 2016/0004899 A1* | 1/2016 | Pi et al. | G06K 9/00033 345/173 |
| 2016/0253540 A1* | 9/2016 | Han et al. | G06K 9/0002 382/124 |

OTHER PUBLICATIONS

A.U. Alam, "Surface Analysis of Materials for Direct Wafer Bonding," MS Thesis, McMaster University, Oct. 2013, 132 pgs.

* cited by examiner

*Primary Examiner* — Andrew W Johns (74) *Attorney, Agent, or Firm* — Allen, Dyer, Doppelt & Gilchrist, P.A.

(57) ABSTRACT

A finger biometric sensor assembly may include a finger biometric sensor integrated circuit (IC) die having a finger sensing area and a cover layer aligned with the finger sensing area. The finger biometric sensor may also include a direct bonding interface between the finger biometric sensor and the cover layer.

26 Claims, 11 Drawing Sheets

FINGER BIOMETRIC SENSOR ASSEMBLY INCLUDING DIRECT BONDING INTERFACE AND RELATED METHODS

TECHNICAL FIELD

The present invention relates to the field of electronics, and, more particularly, to the field of finger sensors.

BACKGROUND

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger.

Where a fingerprint sensor is integrated into an electronic device or host device, for example, as noted above, it may be desirable to more quickly perform authentication, particularly while performing another task or an application on the electronic device. In other words, in some instances it may be undesirable to have a user perform an authentication in a separate authentication step, for example switching between tasks to perform the authentication.

SUMMARY

A finger biometric sensor assembly may include a finger biometric sensor integrated circuit (IC) die having a finger sensing area and a cover layer aligned with the finger sensing area. The finger biometric sensor may also include a direct bonding interface between the finger biometric sensor IC die and the cover layer.

The direct bonding interface may be a hydrophilic direct bonding interface, for example. Alternatively, the direct bonding interface may be a hydrophobic direct bonding interface.

The direct bonding interface may include silicon oxynitride. The direct bonding interface may include silicon oxide, for example.

The direct bonding interface may have a dielectric constant in a range of 4-6, for example. The direct bonding interface may have a thickness less than 1 micron, for example.

The finger biometric sensor IC die may include an uppermost passivation layer over the finger sensing area. The cover layer may include sapphire. The cover layer may also include glass, for example.

The cover layer may have a thickness in a range of 100-300 microns. The cover layer and the finger biometric sensor IC die may have a combined thickness in a range of 150-200 microns, for example. The finger biometric sensor assembly may also include a colored layer between the cover layer and the finger biometric sensor IC die.

A method aspect is directed to a method of making a finger biometric sensor assembly. The method includes aligning finger sensing areas of a finger biometric sensor integrated circuit (IC) die with a cover layer and forming a direct bonding interface between the finger biometric sensor IC die and the cover layer.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to refer to like elements in different embodiments.

Figure 1:
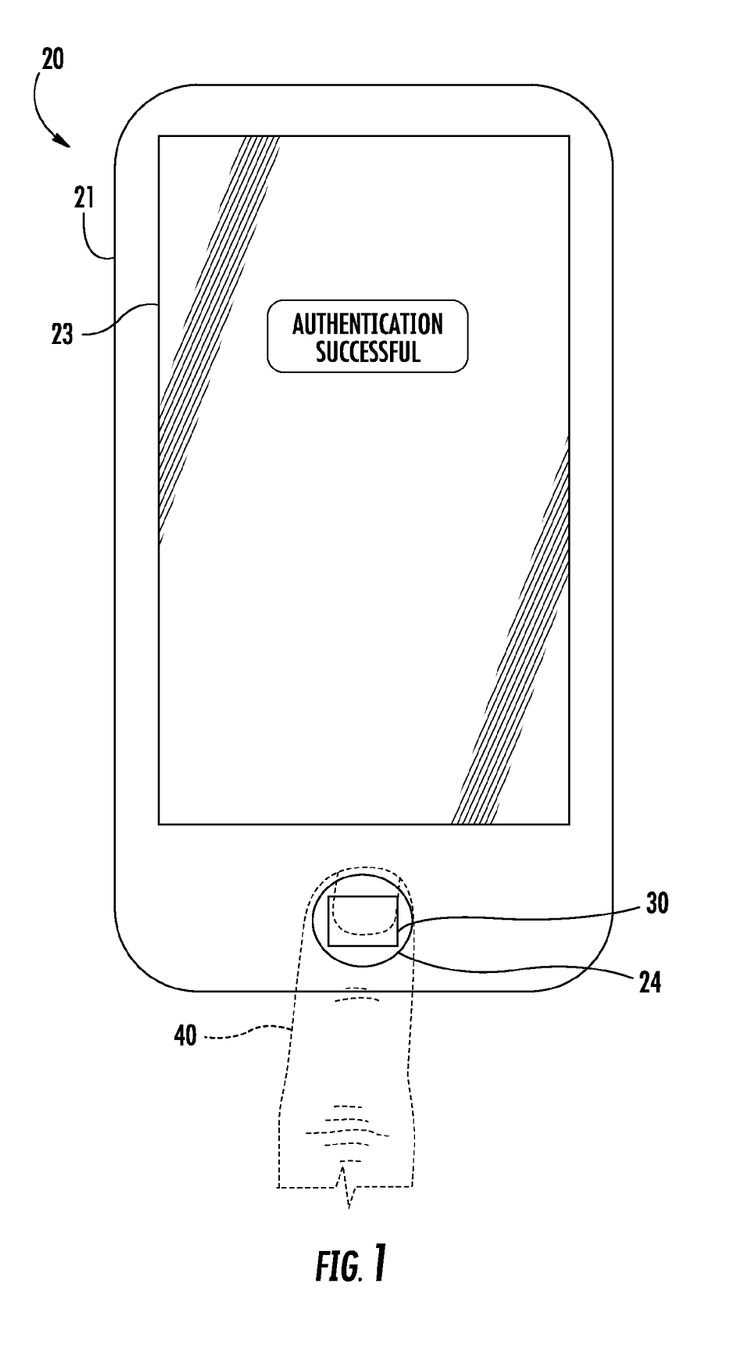
FIG. 1 is a plan view of an electronic device according to an embodiment.
Figure 2:
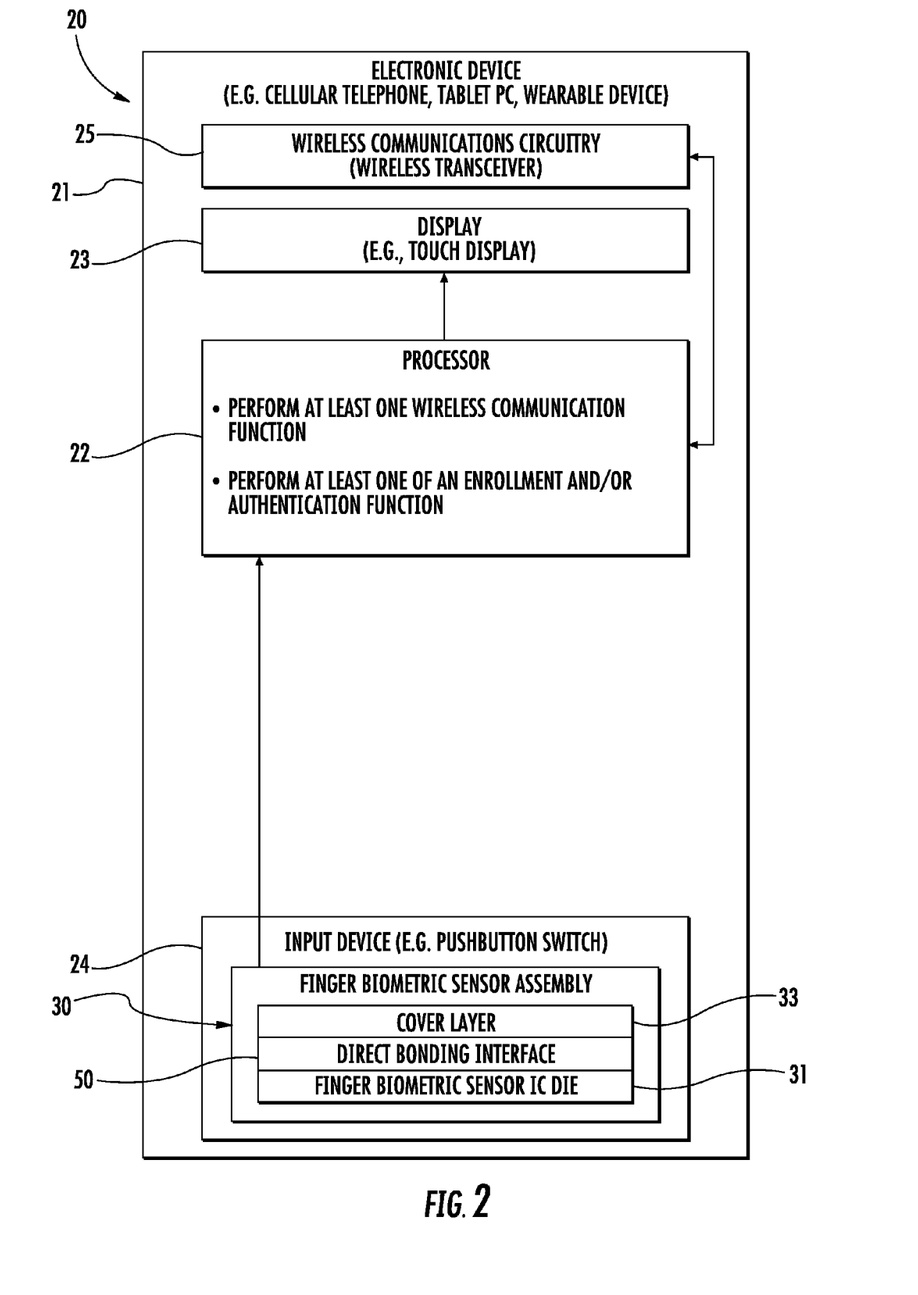
FIG. 2 is a schematic block diagram of an electronic device of FIG. 1.

Referring initially to FIGS. 1 and 2, an electronic device 20 is now described. The electronic device 20 illustratively includes a housing, for example, a portable housing 21, and a processor 22 carried by the portable housing. The electronic device 20 is illustratively a mobile wireless communications device, for example, a cellular telephone. The electronic device 20 may be another type of electronic device, for example, a tablet computer, laptop computer, wearable device, etc.

A wireless transceiver 25 is also carried within the housing 21 and coupled to the processor 22. The wireless transceiver 25 cooperates with the processor 22 to perform at least one wireless communications function, for example, for voice and/or data. In some embodiments, the electronic device 20 may not include a wireless transceiver 25 or other wireless communications circuitry.

A display 23 is also carried by the portable housing 21 and is coupled to the processor 22. The display 23 may be a liquid crystal display (LCD), for example, or may be another type of display, as will be appreciated by those skilled in the art.

The display 23 may also be a touch display as will be appreciated by those skilled in the art. If the display 23 is a touch display, for example, the display 23 acts as both an input device and a display. As such, the display 23 cooperates with the processor 22 to perform one or more device functions in response to input. For example, a device function may include a powering on or off of the electronic device 20, initiating communication via the wireless transceiver 25, and/or performing a menu function based upon input to the display 23.

More particularly, with respect to a menu function, the processor 22 may change the display 23 to show a menu of available applications based upon pressing or input to the touch display. Of course, other device functions may be performed based upon input to the display 23. Other or additional finger-operated user input devices may be carried by the portable housing 21, for example, a pushbutton switch 24, which may be used for a menu function, for example, when the display 23 is not a touch display. The pushbutton switch 24 or any other input device may be used other and/or additional device functions as will be appreciated by those skilled in the art.

The electronic device 20 also includes a finger biometric sensor assembly 30. The finger biometric sensor assembly 30 is carried by the pushbutton switch 24 to sense a user's finger 40. The finger sensor 30 is carried by the pushbutton switch 24 so that when a user contacts and/or presses downward on the pushbutton switch, finger biometric data from the user's finger 40 is acquired, for example, for finger matching and/or finger enrollment to be stored and later used for matching. The finger biometric sensor assembly 30 cooperates with the processor 22 to perform at least one of a finger biometric enrollment and authentication function. Based upon the authentication, for example, a successful authentication, the processor 22 may perform any number of operations, including, for example, security functions, opening or starting an application, a menu function, etc. The processor 22 may cooperate with the finger biometric sensor assembly 30 to perform other function as will be appreciated by those skilled in the art.

Figure 3:
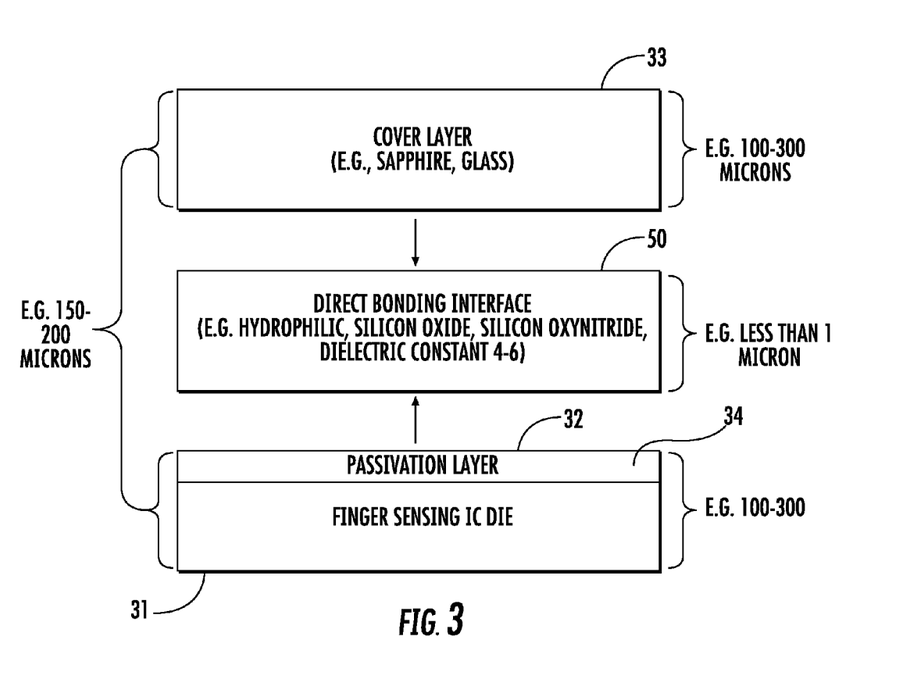
FIG. 3 is an exploded view schematic diagram of the finger biometric sensor assembly of FIG. 2.

Referring now additionally to FIG. 3, the finger biometric sensor assembly 30 includes a finger biometric sensor integrated circuit (IC) die 31 having a finger sensing area 32. More particularly, the finger biometric sensing IC die has an upper surface adjacent defining the finger sensing area 32. The finger biometric sensor IC die 31 also includes an uppermost passivation layer 34 over the finger sensing area 32.

The finger biometric sensor assembly 30 also includes a cover layer 33 aligned with the finger sensing area 32. The cover layer may provide support for the finger biometric sensor assembly 30 and may also provide increased protection of the finger sensing area 32. The cover layer 33 may be glass or sapphire, for example. The cover layer 33 may be another type of a dielectric material. The cover layer 33 has a thickness in a range of 100-300 microns.

A direct bonding interface 50 is between the finger biometric sensor IC die 31 and the cover layer 33. The direct bonding interface 50 is a hydrophilic direct bonding interface. More particularly, the direct bonding interface 50 may include silicon oxynitride. As will be appreciated by those skilled in the art, silicon oxynitride has relatively good hydrophilicity. The direct bonding interface 50 may also include silicon oxide. Of course, the direct bonding interface 50 may include other and/or additional bonding materials that may have relatively good hydrophilicity. The direct bonding interface has a dielectric constant in a range of 4-6 and a thickness of less than 1 micron.

Figure 4A:
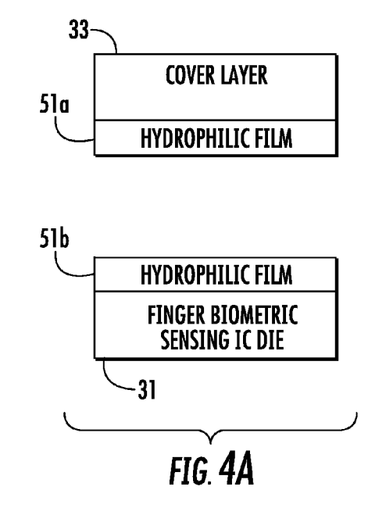
FIGS. 4a-4d are diagrams illustrating a bonding process of the finger biometric sensor IC die and the cover layer via the direct bonding interface in accordance with an embodiment.
Figure 4B:
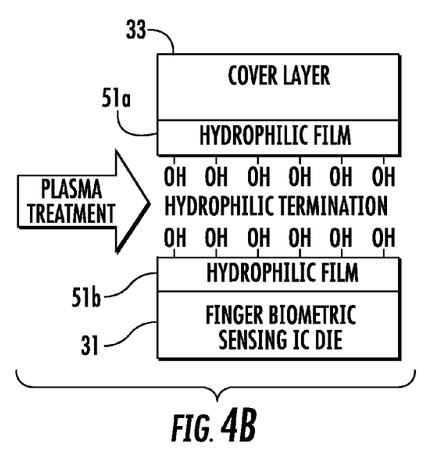
Figure 4C:
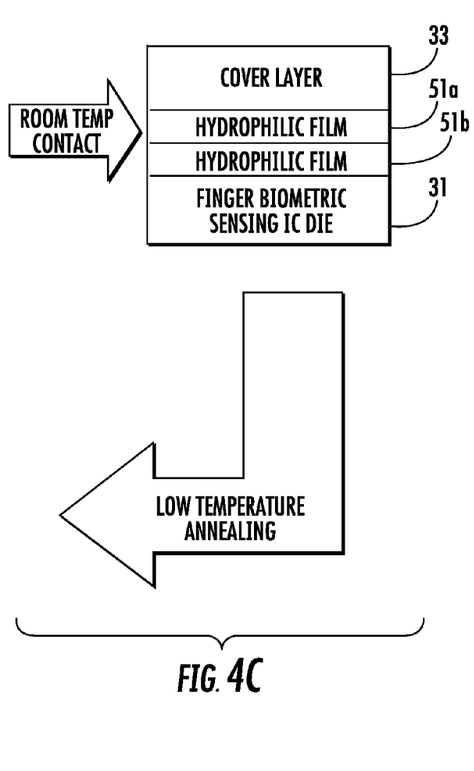
Figure 4D:
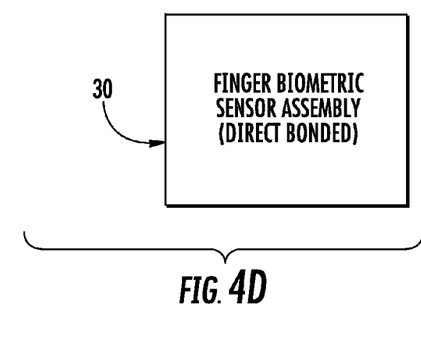

Referring now additionally to FIGS. 4a-4d, bonding of the finger biometric sensor IC die 31 and the cover layer 32 via the direct bonding interface 50 will now be described. Hydrophilic films 51a, 51b are formed on two relatively clean and flat surfaces, one of the cover layer 32 and the other of the finger biometric sensing IC die 31, (i.e., the finger sensing area 32) (FIG. 4a). The hydrophilic films 51a, 51b may be subject to a chemical-mechanical planarization/polishing (CMP) process that may result in a surface roughness (RMS) of less than 10 nm, and more specifically, less than 5 nm. The hydrophilic films 51a, 51b may be silicon oxynitride or silicon oxide, for example. The hydrophilic films 51a, 51b are plasma treated resulting in a hydrophilic termination (FIG. 4b). At room temperature, for example, the cover layer 32 and finger biometric sensor IC die 31 are brought together so that the hydrophilic films 51a, 51b, which make up the direct bonding interface 50, contact (FIG. 4c). A low temperature annealing is performed to the finger biometric sensor assembly 30 to complete the bonding or provide a more permanent boding. The low temperature annealing process may be performed below 200° C., for example, and more particularly, in a range of about 145° C.-150° C. The result is the directed bonded finger biometric sensor assembly 30 (FIG. 4d).

Figure 5:
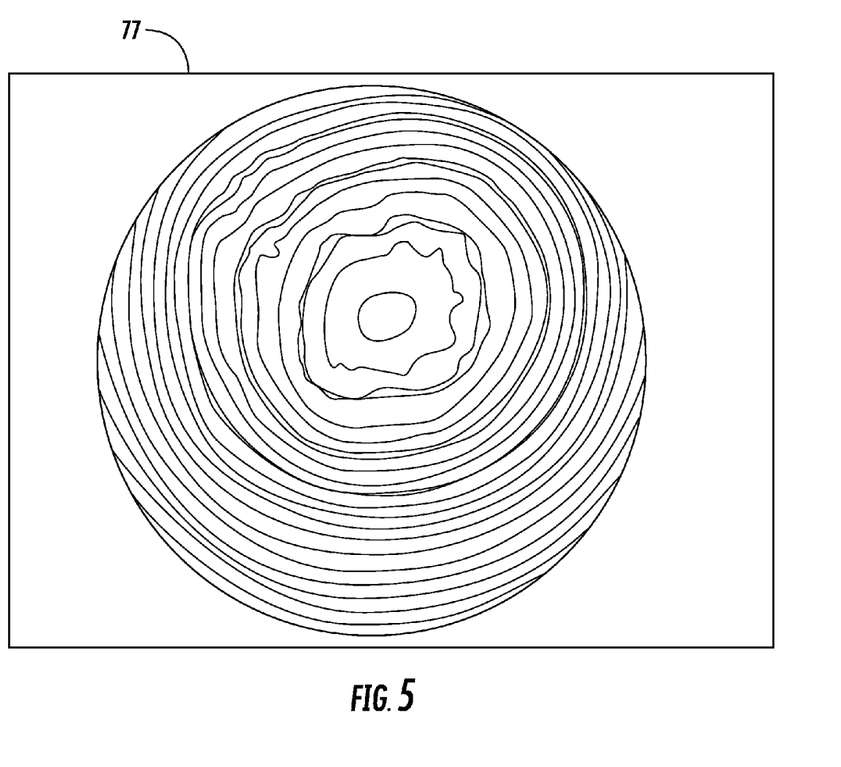
FIG. 5 is an acoustic microscopy photograph of bonded silicon and a glass wafer.

Referring briefly to FIG. 5, an acoustic microscopy for characterization of voids 77 is illustrated for the direct bonding of silicon and glass to show that the use of a direct bonding interface, for example, as described in the embodiments herein is in fact feasible. Temperature cycling from −40° C. to +85° C. over 50 cycles has shown no damage and no porosity. Minor porosity may be addressed by proper fixtures and optimizing the direct bonding recipe or process, as will be appreciated by those skilled in the art.

Figure 6:
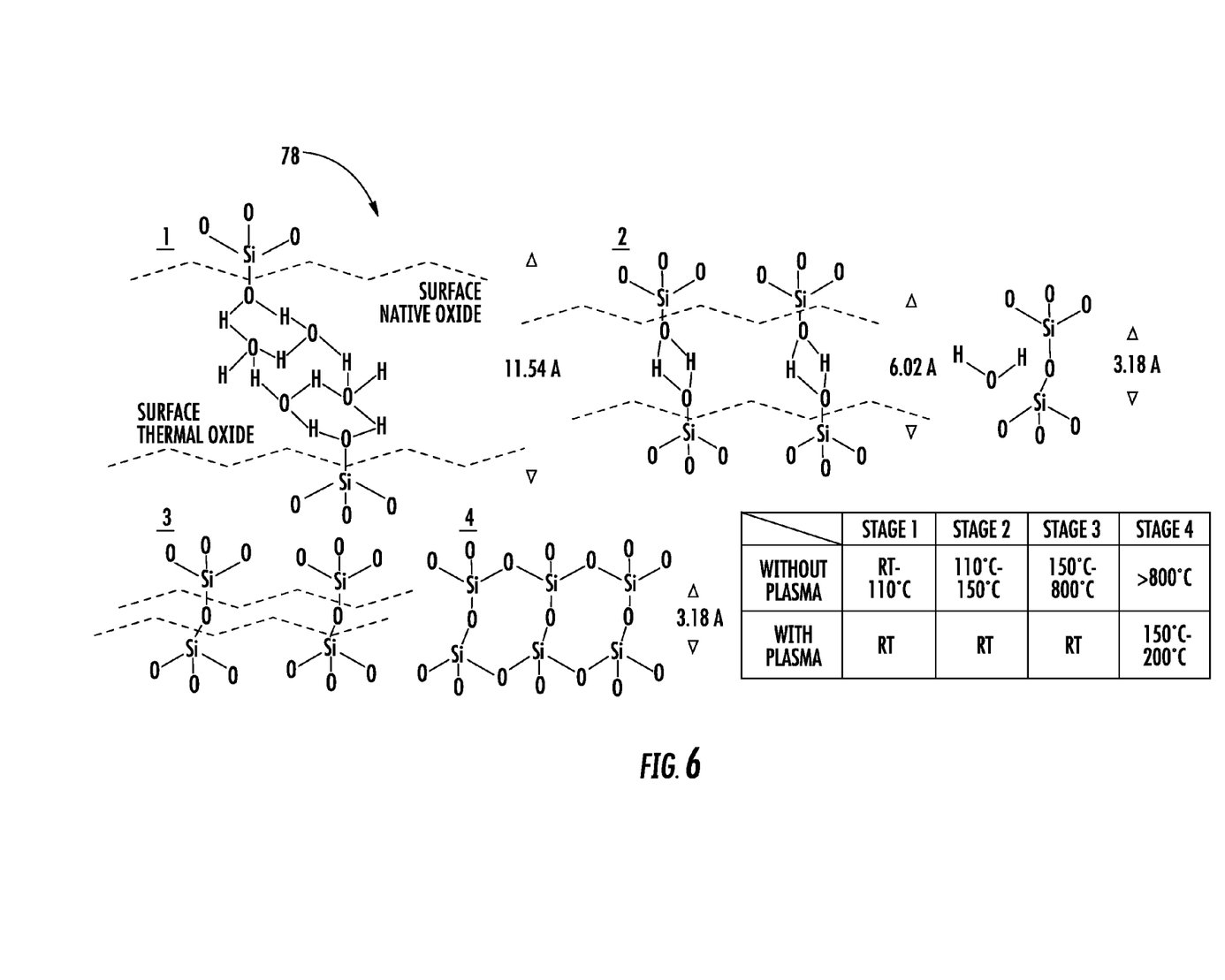
FIG. 6 a diagram of the chemistry of direct bonding with and without plasma treatment and corresponding temperature ranges.

The above described process can be contrasted with what can be considered a conventional direct bonding process. In a conventional direct bonding process, for example, two bodies are brought together at room temperature to form a weak bond therebetween through van der Waals forces. The combined bodies are annealed at relatively high temperatures, for example at about 1200° C. A conventional direct bonding process generally will not work because of the high temperature susceptibility of the finger biometric sensing IC die 31. Moreover, as will be appreciated by those skilled in the art, the high temperatures from the high-temperature annealing may cause color distortion of any color layers, as will be described further below, and may cause any nonvolatile memory that may have been previously loaded to be erased. The diagram 78 in FIG. 6 illustrates the chemistry of direct bonding with and without plasma treatment and corresponding temperature ranges. Further details of this chemistry can be found in, A. U. Alam, *Surface Analysis of Materials for Direct Wafer Bonding*, MS Thesis, McMaster University, October, 2003.

As will be appreciated by those skilled in the art, the finger biometric sensor assembly 30 may have a reduced overall thickness (e.g., in some embodiments, 150-200 microns for the cover layer and the finger biometric sensor IC die combined), relative to prior art finger biometric sensor assemblies. In particular, the finger biometric sensor assembly 30 does not include a glue layer, which may account for about 8-10 microns of height. A glue layer also generally has a dielectric constant of about three and also generally has conductive particles, both of which may increasingly dissipate electric fields with respect to the finger biometric sensing IC die 31. The glue layer also tends to vary across the finger biometric sensor IC die causing tilt. Thus, by using a glue layer between a cover layer and a finger biometric sensor IC die, for example, the reliability of the finger biometric assembly and the quality of sensed finger biometric data may be negatively affected.

The direct bonding interface 50 reduces overall thickness of the finger biometric sensor assembly 30, which may be particularly advantageous in smaller electronic devices, for example, wearable electronic devices. As noted above, the combined cover layer 33 and the finger biometric sensor IC die 31 may have a combined thickness in a range of 150-200 microns, and the direct bonding interface 50 may have a thickness of less than 1 micron.

Simulations were conducted to determine performance of a finger biometric sensor assembly with the claimed direct bonding interface and without the direct bonding interface (i.e., the glue layer). The simulations were performed based upon a sapphire cover layer having a thickness of 300 and 100 microns and a dielectric constant of 10 and a silicon chip. The simulations using the glue layer were based upon a 8 micron thick glue layer having a dielectric constant of 3, while the direct bonding interface simulations were performed based upon a silicon oxynitride direct bonding interface having a thickness of 2 microns and a dielectric constant of 5. The results of the simulation are below in Table 1.

TABLE 1

|  | Sapphire Thickness (μm) | | | |
| --- | --- | --- | --- | --- |
|  | 300 μm | | 100 μm | |
|  | With Glue | No Glue | With Glue | No Glue |
| Capacitance (F) | 3.590E−10 | 3.878E−10 | 7.6570E−10 | 9.75080E−10 |
| % Improvement | | 8% | | 27% |

Figure 7A:
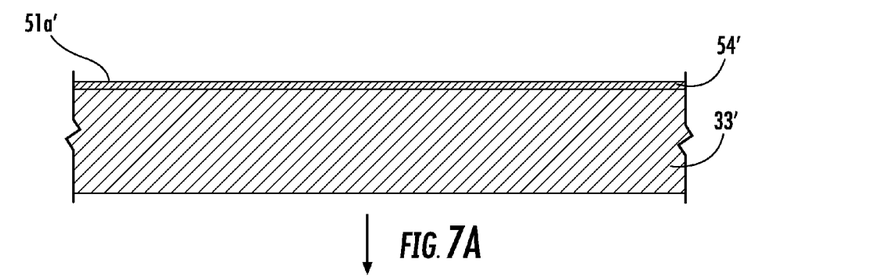
FIGS. 7a-7j are schematic diagrams illustrating a process flow for an embodiment of a finger biometric sensor assembly.

Referring now to FIGS. 7a-7j, a process flow for an embodiment of a finger biometric sensor assembly 30' is illustrated. A colored layer 54', for example, a black or white colored film, may be deposited on the cover layer 33' (FIG. 7a). The color layer 54' may be for aesthetic purposes, for example, matching to the housing 21' of the electronic device 30'. A hydrophilic film 51a', for example, silicon oxide or silicon oxynitride, is deposited on the cover layer 33' (which may be in the form of a wafer), and more particularly, on the color layer 54' (FIG. 7a). The hydrophilic film 51a' is planarized, for example, using a CMP process (FIG. 7a), for example, to have a surface roughness (RMS) of less than 10 nm, and more specifically, less than 5 nm. The hydrophilic film 51a' is plasma treated.

Figure 7B:
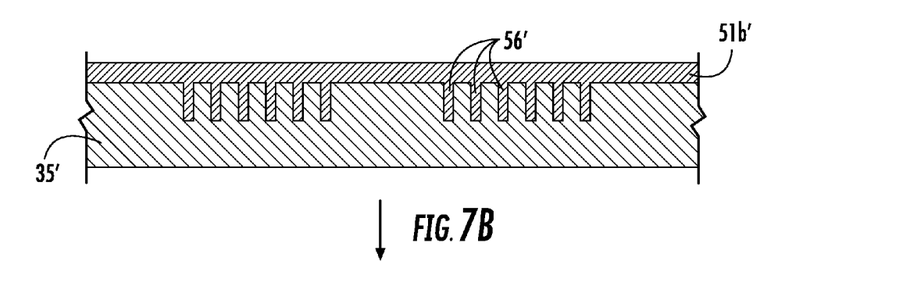

Through silicon vias 56' (TSVs) are formed in finger biometric sensing IC wafer 35' (e.g., silicon, complementary metal oxide semiconductor (CMOS) (FIG. 7b)). The finger biometric sensing IC wafer 35' includes front and back passivation layers. A hydrophilic film 51b' is formed or deposited on the surface from which the blind TSVs 56' have been formed (FIG. 7b). Similar to the hydrophilic film 51a', the hydrophilic film 51b' is also subjected to a CMP process for example, and plasma treated (FIG. 7b). It is generally desirable to have white space around each die in the finger biometric sensing IC wafer 35' for example, for singulation. However, while the white space may mean that there are less die per wafer, the cost of the white space may be offset by not having to use temporary carriers, thin die handling, etc.

Figure 7C:
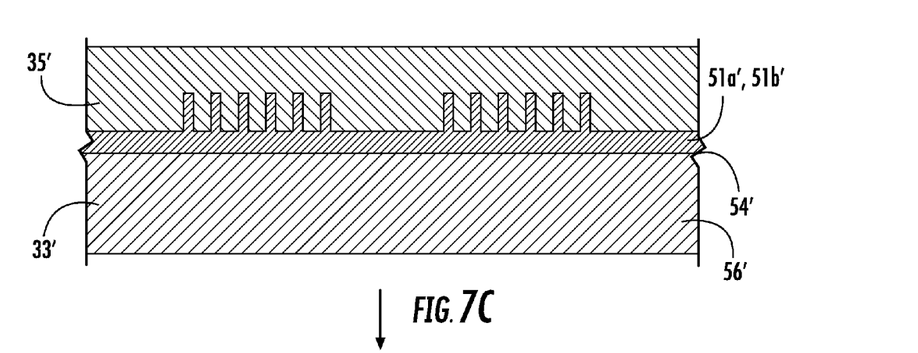

The finger biometric sensing IC wafer 35' and the cover layer 33' are coupled together and direct bonded at a low temperature, for example, below 200° C., and more particularly, between 145° C.-150° C. (FIG. 7c). Advantageously, there is no need for temporary bonding.

Figure 7D:
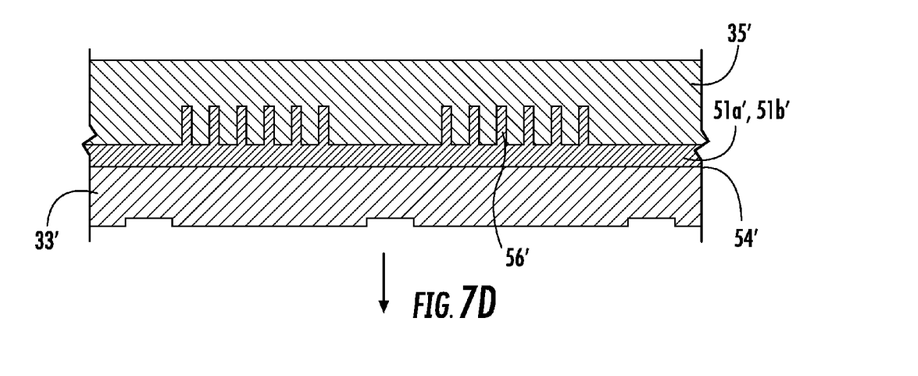

The cover layer 33' is thinned and patterned (FIG. 7d). Because of the composite finger biometric sensing IC wafer 35', the cover layer (e.g., glass) may be about 100-150 microns thick.

Figure 7E:
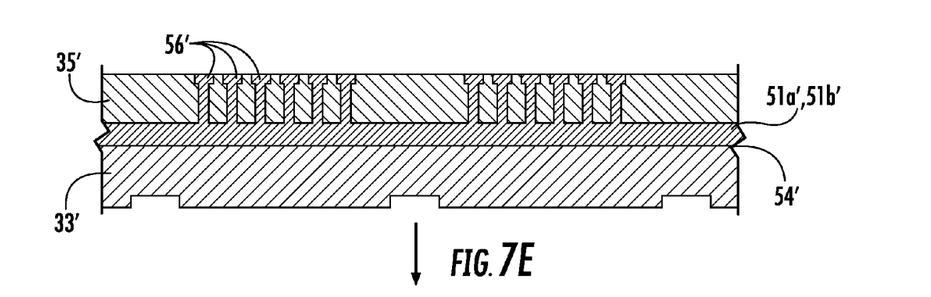

The finger biometric sensing IC wafer 35' is also thinned (FIG. 7e). Backside redistribution and under bump metalization may also be performed. Since silicon is attached to the cover layer 33', e.g. glass, the finger biometric sensing IC die 35' can be made very thin, for example, about 50 microns. This would mean that the TSVs 56' may not necessarily have to be 12 microns in diameter, but instead could be between 6 and 7 microns in diameter, for example, which increases the active sensing area, i.e., finger sensing area, and increased signal speed.

Figure 7F:
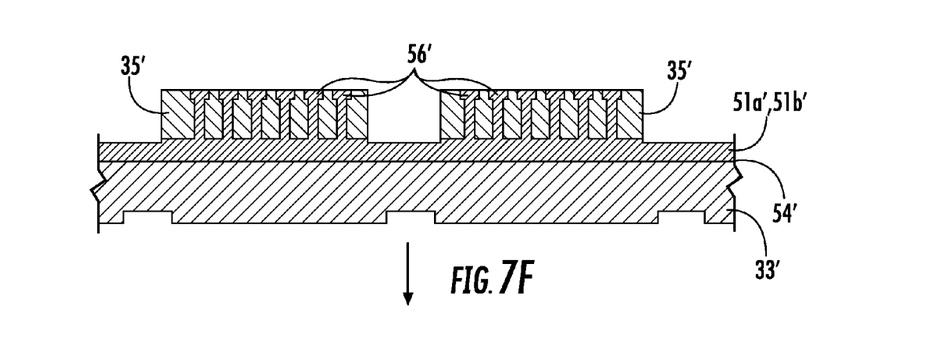

The finger biometric sensing IC wafer 35' is etched for singulation (FIG. 7f). The etching may be a deep reactive-ion etching (DRIE) etching, for example. If DRIE etching is used for singulation, the die can be any shape, for example, circular, hexagonal, etc.

Figure 7G:
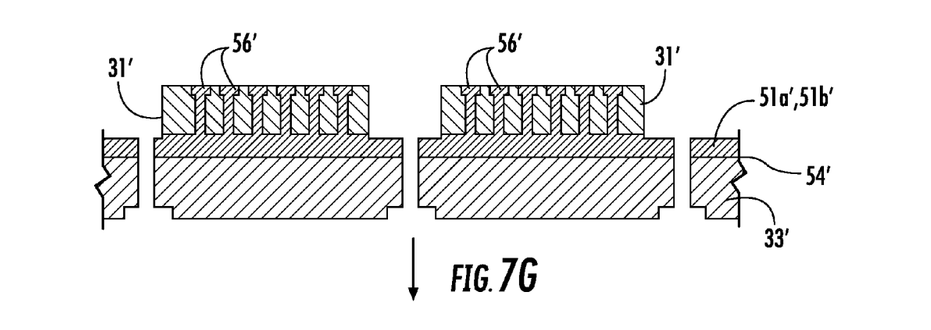
Figure 7H:
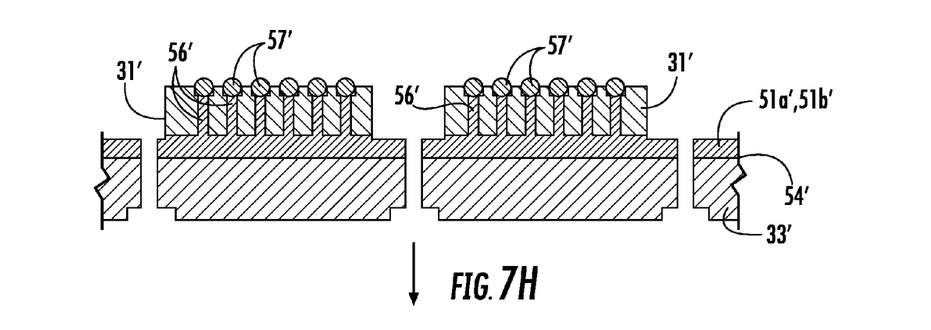
Figure 7I:
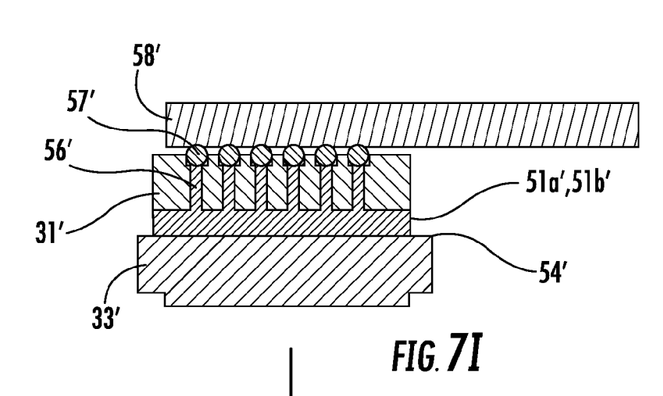
Figure 7J:
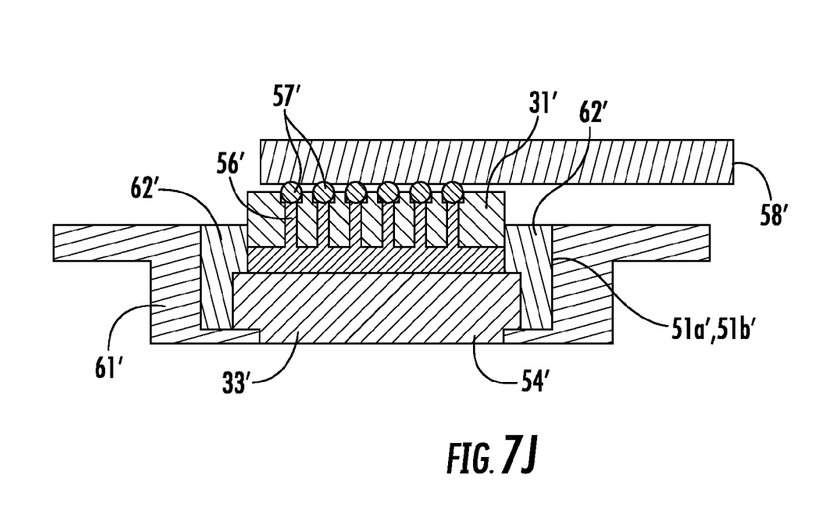

The cover layer 33' is then cut, for example, using a laser and optionally polished (FIG. 7g). Connectors 57', for example, solder balls, may be attached (FIG. 7h). With a composite thickness between 150-200 microns, for example, there will generally not be any warpage issue resulting from the connector 57' attachment. Accordingly, wirebonding for connection to a flexible circuit 58' may not be desired, and there may be a further reduction in parasitic, as will be appreciated by those skilled in the art (FIG. 7i). The finger biometric sensor assembly 30' is assembled in a trim 61' and may be secured to the trim by an adhesive 62' (FIG. 7j). Advantageously, the finger sensing area 32' of the finger biometric sensor IC die 31' may not be subjected to particles and damage during shipping, for example, as the finger biometric sensor assembly 30' includes the cover layer 33' when shipped.

Figure 8:
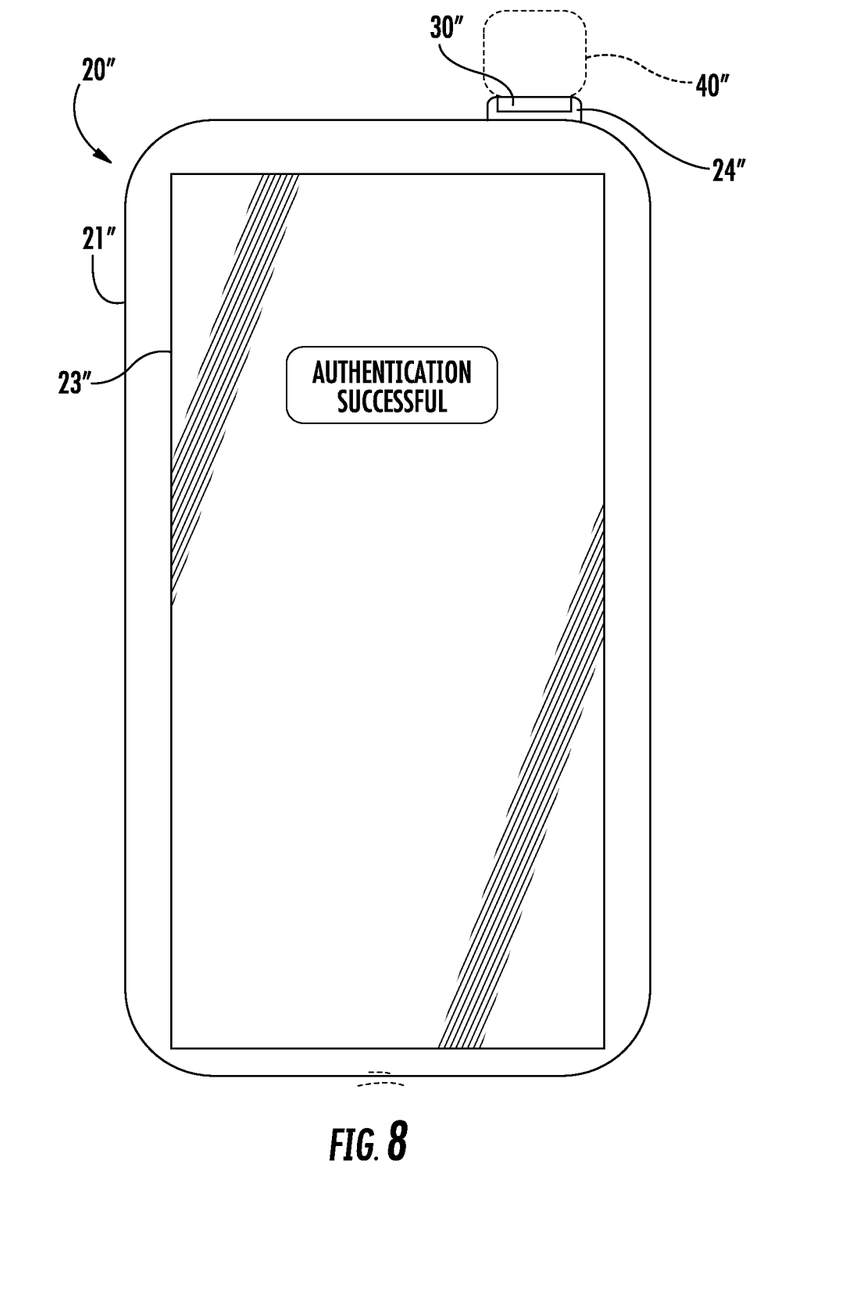
FIG. 8 is plan view of an electronic device according to another embodiment.

Because the finger biometric sensor assembly 30 is smaller than prior art finger biometric sensor assemblies, the finger biometric sensor assembly may located in where real-estate has been limited, for example, along a thin side of the housing 21. Referring briefly to FIG. 8, in another embodiment, the finger biometric sensor assembly 30" is illustratively carried along a perimeter of the housing 21" of the electronic device 20"'. In particular, the finger biometric sensor assembly 30" may be carried by an input device 24", e.g., power button, along the relative thin edge of the housing 21". This may allow for the display 23" to be larger, for example.

Figure 9:
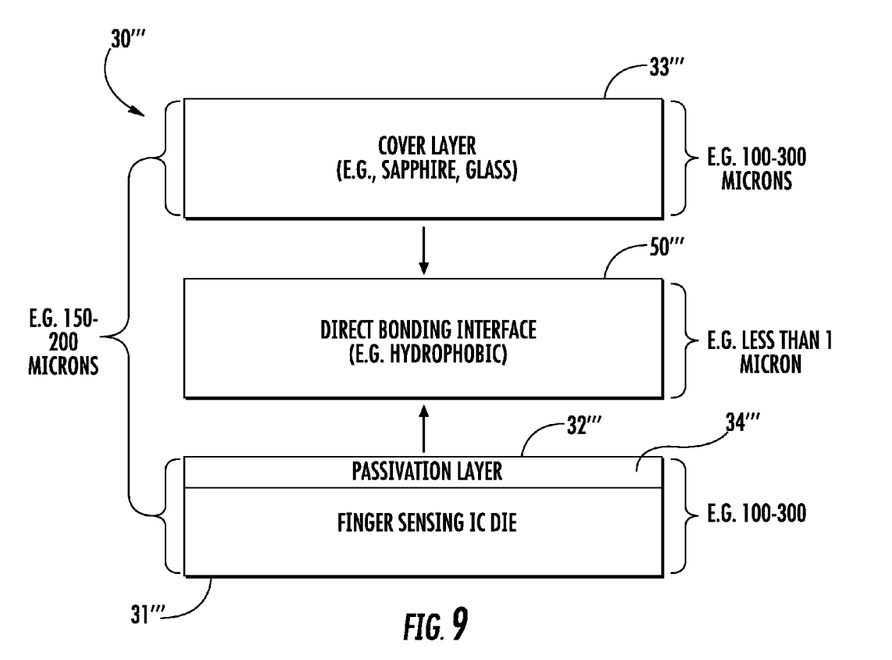
FIG. 9 is an exploded view schematic diagram of a finger biometric sensor assembly in accordance with another embodiment.

Referring to FIG. 9, in another embodiment the direct bonding interface includes a hydrophobic direct bonding interface 50'''. With a hydrophobic process, there are $H_2$ bonds instead of OH bonds and the direct bonding process is performed in a vacuum. In contrast, a hydrophilic process is typically not performed in a vacuum.

While the cover layer 33 has been described herein as being glass or sapphire, those skilled in the art will appreciate that sapphire may have more desirable properties over glass, but also has limitations. In particular, sapphire allows the separation of electric fields from adjacent pixels of the finger biometric sensing IC die 31 by way of being anisotropic (e.g. having a permittivity of 9 and a c-axis permittivity of 11.5). However, sapphire may not be generally available in relatively large size wafers, for example, 12-inch wafers.

An effect similar to that of sapphire may be achieved using glass having a smaller thickness. However, glass is isotropic, resulting in a larger divergence of electric field lines emanating from each pixel (e.g., having a permittivity of about 6 and c-axis permittivity of about 6). Glass is generally available in larger sized wafers, for example, 12-inch wafers.

Simulations were performed that indicated a desire for fringing fields. The simulations were performed for 300 micron thickness glass and sapphire, and 100 micron glass and sapphire. The resultant capacitance was simulated at 1.140E-10F for glass at a 300 micron thickness, 1.628E-10F for sapphire at a 300 micron thickness, 1.910E-10F for glass at a 100 micron thickness, and 2.354E-10F for sapphire at a 100 micron thickness.

If sapphire is used, as noted above, a 12-inch wafer, for example, may not be possible. Accordingly, it may be desirable to direct bond the finger biometric sensing IC die 31 to the sapphire cover layer and then glue trim around the finger biometric sensing assembly. Another technique for addressing the unavailability of a relatively large sized sapphire wafer is to direct bond slabs of sapphire (i.e., one sapphire slab for each resultant die) to the silicon wafer after front-side processing as described above.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

Many modifications and other embodiments will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A finger biometric sensor assembly comprising:
   a finger biometric sensor integrated circuit (IC) die having a finger sensing area;
   a cover layer aligned with the finger sensing area; and
   a direct bonding interface between the finger biometric sensor IC die and the cover layer.

2. The finger biometric sensor assembly of claim 1 wherein the direct bonding interface comprises a hydrophilic direct bonding interface.

3. The finger biometric sensor assembly of claim 1 wherein the direct bonding interface comprises a hydrophobic direct bonding interface.

4. The finger biometric sensor assembly of claim 1 wherein the direct bonding interface comprises silicon oxynitride.

5. The finger biometric sensor assembly of claim 1 wherein the direct bonding interface comprises silicon oxide.

6. The finger biometric sensor assembly of claim 1 wherein the direct bonding interface has a dielectric constant in a range of 4-6.

7. The finger biometric sensor assembly of claim 1 wherein the direct bonding interface has a thickness less than 1 micron.

8. The finger biometric sensor assembly of claim 1 wherein the finger biometric sensor IC die comprises an uppermost passivation layer over the finger sensing area.

9. The finger biometric sensor assembly of claim 1 wherein the cover layer comprises sapphire.

10. The finger biometric sensor assembly of claim 1 wherein the cover layer comprises glass.

11. The finger biometric sensor assembly of claim 1 wherein the cover layer has a thickness in a range of 100-300 microns.

12. The finger biometric sensor assembly of claim 1 wherein the cover layer and the finger biometric sensor IC die have a combined thickness in a range of 150-200 microns.

13. The finger biometric sensor assembly of claim 1 further comprising a colored layer between the cover layer and the finger biometric sensor IC die.

14. An electronic device comprising:
   a housing;
   a user input device carried by the housing; and
   a finger biometric sensor assembly carried by the user input device comprising
      a finger biometric sensor integrated circuit (IC) die having a finger sensing area,
      a cover layer aligned with the finger sensing area, and
      a direct bonding interface between the finger biometric sensor IC die and the cover layer.

15. The electronic device of claim 14 wherein the direct bonding interface comprises a hydrophilic direct bonding interface.

16. The electronic device of claim 14 wherein the direct bonding interface comprises a hydrophobic direct bonding interface.

17. The electronic device of claim 14 wherein the direct bonding interface comprises silicon oxynitride.

18. The electronic device of claim 14 wherein the direct bonding interface comprises silicon oxide.

19. The electronic device of claim 14 wherein the user input device comprises a pushbutton switch input device.

20. A method of making a finger biometric sensor assembly comprising:
   aligning a finger sensing areas of a finger biometric sensor integrated circuit (IC) die with a cover layer; and
   forming a direct bonding interface between the finger biometric sensor IC die and the cover layer.

21. The method of claim 20 wherein forming the direct bonding interface comprises forming a hydrophilic direct bonding interface.

22. The method of claim 20 wherein forming the direct bonding interface comprises forming a hydrophobic direct bonding interface.

23. The method of claim 20 wherein forming the direct bonding interface comprises forming a direct bonding interface comprising silicon oxynitride.

24. The method of claim 20 wherein forming the direct bonding interface comprises forming a direct bonding interface comprising silicon oxide.

25. The method of claim 20 wherein forming the direct bonding interface comprises forming the direct bonding interface based upon a plasma treatment.

26. The method of claim 20 wherein the direct bonding interface is formed at a temperature of less than 200° C.

* * * * *

UNITED STATES PATENT AND TRADEMARK OFFICE
CERTIFICATE OF CORRECTION

| | | |
|---|---|---|
| PATENT NO. | : 9,679,187 B2 | Page 1 of 1 |
| APPLICATION NO. | : 14/741831 | |
| DATED | : June 13, 2017 | |
| INVENTOR(S) | : Bhagavat et al. | |

It is certified that error appears in the above-identified patent and that said Letters Patent is hereby corrected as shown below:

In the Claims

Column 9, Line 12,    Delete: "areas"
Claim 20    Insert --area--

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*